United States Patent Office 3,523,127
Patented Aug. 4, 1970

3,523,127
PROCESS FOR PREPARING 17α-ACETOXY-6-METH-YL-PREGNA-4,6-DIENE-3,20-DIONE AND INTERMEDIATES OBTAINED THEREIN
Sundara Pattabi Raman, Montreal, Quebec, and David J. Marshall, Hampstead, Quebec, Canada, assignors to American Home Products Corporation, New York, N.Y., a corporation of Delaware
No Drawing. Filed June 11, 1968, Ser. No. 735,976
Int. Cl. C07c 169/34
U.S. Cl. 260—397.4                              4 Claims

ABSTRACT OF THE DISCLOSURE

There is disclosed herein a process for preparing 17α-acetoxy-6-methylpregna-4,6-diene-3,20 - dione, comprising treating 3β,17α-diacetoxy-5α-hydroxypregnane-6,20-diene with a methyl magnesium halide or methyl lithium to obtain 3β,17α - diacetoxy-5α,6β - dihydroxy-6α-methylpregnan-20-one, selectively hydrolyzing the latter to obtain 17α - acetoxy - 3β,5α-6β-trihydroxy-6α-methylpregnan-20-one, oxidizing the latter with chromic acid to obtain 17α-acetoxy-5α,6β-dihydroxy-6-methylpregna-3,20-dione, and dehydrating said last-named compound by treatment with a mineral acid.

---

The present invention relates to a process for preparing 17α-acetoxy-6-methylpregna-4,6-diene-3,20-dione (V), a potent progestational agent also known under its generic name of megestrol acetate and useful in veterinary practice and in human therapy.

It is a particular advantage of the process of this invention that 17α, acetoxy-6-methylpregna-4,6-diene-3, 20-dione may be prepared in good yields from easily available starting materials.

More specifically, we prefer to use as starting material the compound 3β-17α-diacetoxy-5α-hydroxypregnane-6, 20-dione (I), prepared as described in U.S. Pat. 3,346,603, issued Oct. 10, 1967, by treating 17α-acetoxypregnenolone acetate with peracetic acid to obtain an intermediate mixture of 5,6-epoxides which is in turn treated with periodic acid to obtain the intermediate 3β,17α-diacetoxy-5α,6β-dihydroxypregnan-20-one, and oxidizing the latter compound with chromic acid.

Said starting material of Formula I is treated with a molar excess of a methyl magnesium halide or methyl lithium in solution in an inert solvent, such as tetrahydrofuran, diethyl ether, or mixtures of those solvents with an aromatic hydrocarbon such as benzene, toluene, or xylene for a short period of time at a relatively low temperature, i.e. not above room temperature to yield 3β-17α - diacetoxy-5α,6β-dihydroxy-6α-methylpregnan-20-one (II). In this step the ratio of methyl magnesium halide or of methyl lithium to starting material, the temperature, and the time of reaction appear to be critical. Operative conditions include a molar ratio of methyl magnesium halide or methyl lithium to starting material of from 5:1 to 20:1, temperatures from room temperature to 0° C., and times of reaction of from 1 to 45 minutes. Preferred conditions include the use of methyl magnesium bromide in a molar ratio of 7:1 to 9:1, a reaction temperature close to 0° C. and reaction times of from two to three minutes. It is a surprising and distinguishing feature of this invention that under those preferred conditions the reaction takes place substantially only on the 6-keto group of the starting material, and that the 20-keto group as well as the acetoxy groups in positions 3β and 17α remain virtually untouched under the conditions outlined above.

Alkaline hydrolysis at room temperature of the product obtained as described above eliminates the 3-acetoxy group, to yield 17α-acetoxy-3β, 5α,6β-trihydroxy-6α-methylpregnan-20-one (III), and said last-named compound is oxidized with chromic acid to the corresponding 3-ketone, 17α-acetoxy-5α,6β - dihydroxy-6-methylpregna-3,20-dione. Finally, dehydration of said lastnamed compound by treatment with a mineral acid, preferably hydrochloric acid in ethanol solution, yields the desired 17α, acetoxy-6-methylpregna-4,6-diene-3,20-dione (V).

The following formulae in which Ac represents the acetyl group, and examples will illustrate this invention:

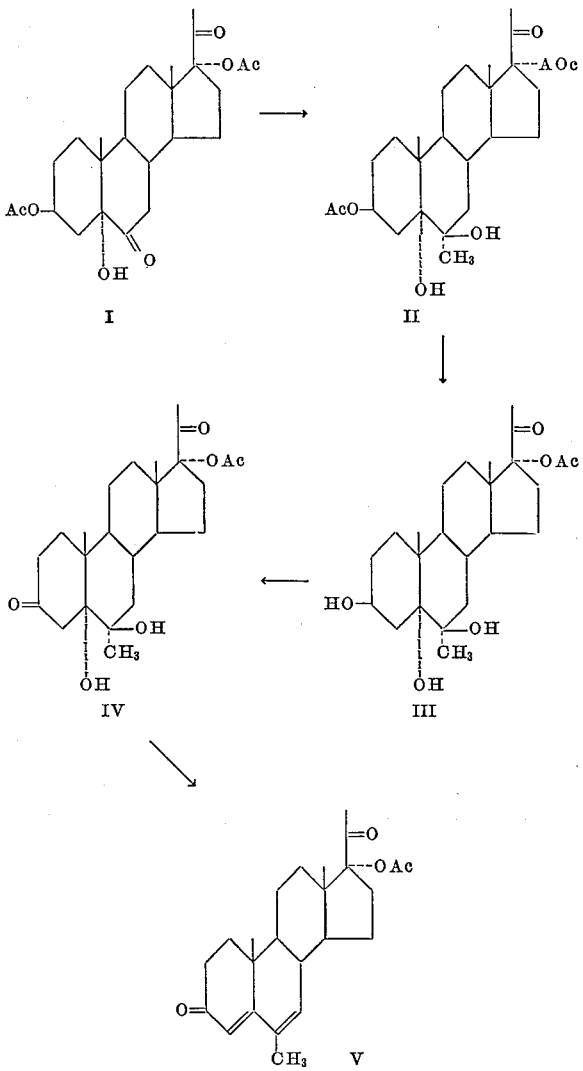

EXAMPLE 1

3β,17α-diacetoxy-5α,6β-dihydroxy-6α-methylpregnan-20-one

To an ice-cold and vigorously stirred solution of dry 3β,17α-diacetoxy-5α-hydroxy-pregnane-6,20-dione (5 g., 11.2 millimole) in dry tetrahydrofuran (100 ml.) an ice cold tetrahydrofuran-benzene solution of methyl magnesium bromide (2 M solution; 37.5 ml.; 0.075 mole) is added over 30 to 60 seconds and the clear reaction mixture is stirred for a further period of 90 seconds at the same temperature. The reaction is quenched by addition of a saturated solution of ammonium chloride (30 ml.). After dilution with water (80 ml.), the organic layer is separated and the aqueous layer extracted three times with ethyl acetate (30 ml.). The combined organic layer is washed with dilute hydrochloric acid (10%, 25 ml.) and with water, dried, and evaporated. The residue is dissolved in refluxing benzene (300 ml.) and allowed to cool, to give the title compound with M.P. 235–236° C. after crystallization from aqueous acetone.

In the same manner, but using methyl magnesium chloride, methyl magnesium iodide, or methyl lithium and using diethyl ether instead of tetrahydrofuran and toluene or xylene instead of benzene, the title compound is also obtained.

EXAMPLE 2

17α-acetoxy-3β,5α,6β-trihydroxy-6α-methylpregnan-20-one

3β,17α-diacetoxy-5α,6β-dihydroxy - 6α - methylpregnan-20-one (2 g.; 4.3 millimole), obtained as described in Example 1, is stirred for 2.5 hours at room temperature with aqueous methanol (10%, 40 ml.) containing potassium carbonate (336 mg., 2 millimole). Dilution with water gives a precipitate which is filtered, washed free from alkali and dried. Crystallisation from benzene-ether mixture gives the title compound as colourless leaflets with M.P. 226–230° C.

EXAMPLE 3

17α-acetoxy-5α,6β-dihydroxy-6-methylpregna-3,20-dione

An ice cold solution of 17α-acetoxy-3β,5α,6β-trihydroxy-6α-methylpregnan-20-one (1.8 g.) obtained as described in Example 2, in acetone (150 ml.) is titrated with vigorous stirring with 8 N chromic acid (Jones' Reagent) until the colour of chromic acid persisted (3.5 ml.). Stirring is continued at room temperature for fifteen minutes, after which the solids are filtered off and washed with acetone. The filtrate is evaporated to dryness, the residue taken up in ethyl acetate (30 ml.) washed free of acid, dried and evaporated. Crystallisation of the residue from aqueous methanol gives the title compound as colourless sharp needles with M.P. 245–246° C.

EXAMPLE 4

17α-acetoxy-6-methylpregna-4,6-diene-3,20-dione

17α-acetoxy-5α,6β-dihydroxy - 6 - methylpregna-3,20-dione (1.0 g.), obtained as described in Example 3, is heated under reflux with ethanol (50 ml.) containing concentrated hydrochloric acid (5 ml.) for 1.5 hours. The solvent is evaporated to leave a residue which is taken up in ethyl acetate, washed free of acid, dried and evaporated to give the title compound with M.P. 215–218° C. after crystallization from aqueous methanol, $[\alpha]_D^{24} + 9.5°$ (1% in chloroform)

$\lambda_{max.}^{ethanol}$ 290 m$\mu$., $\epsilon$ 25,600

We claim:
1. The process of preparing 17α-acetoxy-6-methylpregna - 4,6 - diene-3,20-dione which comprises treating 3β,17α-diacetoxy-5α-hydroxypregnane-6,20-dione with a molar excess of a reagent selected from the group which consists of methyl magnesium halides and methyl lithium at a relatively low temperature, thereby obtaining 3β,17α-diacetoxy-5α,6β-dihydroxy - 6α - methylpregnan-20-one; subjecting said last-named compound to hyldrolysis under alkaline conditions, thereby obtaining 17α-acetoxy-3β,5α,6β-trihydroxy - 6α - methylpregnan-20-one; oxidizing said last-named compound by treatment thereof with chromic acid, thereby obtaining 17α-acetoxy-5α,6β-dihydroxy - 6 - methylpregna-3,20-dione; and dehydrating said last-named compound by treatment thereof with a mineral acid, thereby obtaining 17α-acetoxy-6-methylpregna-4,6-diene-3,20-dione.

2. In a process as claimed in claim 1 the steps of treating 3β,17α - diacetoxy-5α-hydroxypregnan-6,20-dione with a molar excess of a reagent selected from the group consisting of methyl magnesium halides and methyl lithium for a short period of time at a relatively low temperature, and isolating 3β,17α-diacetoxy-5α,6β-dihydroxy-6α-methylpregnan-20-one from the reaction mixture.

3. The process as claimed in claim 1 wherein a molar ratio of methyl magnesium bromide to starting material within the range 5:1 to 20:1 is employed, the temperature falls within the range room temperature to 0° C., and the time of the reaction falls within the range 1 minute to 45 minutes.

4. The process as claimed in claim 1 wherein a molar ratio of methyl magnesium bromide to starting material within the range 7:1 to 9:1 is employed, the temperature is close to 0° C., and the reaction time falls within the range 2 minutes to 3 minutes.

References Cited

UNITED STATES PATENTS 3,143,556    8/1964    Campbell et al. ____ 260—397.4

ELBERT L. ROBERTS, Primary Examiner

U.S. Cl. X.R.

260—239.55